United States Patent [19]

Coby

[11] Patent Number: 5,157,317

[45] Date of Patent: Oct. 20, 1992

[54] METHOD AND APPARATUS FOR EMPLOYING AN UNREGULATED POWER SUPPLY TO POWER PRECISION MOTORS IN A PEN PLOTTER

[75] Inventor: August D. Coby, Brea, Calif.

[73] Assignee: CalComp Inc., Anaheim, Calif.

[21] Appl. No.: 709,893

[22] Filed: Jun. 4, 1991

[51] Int. Cl.$^5$ .......................................... G05D 23/275
[52] U.S. Cl. .................................... 318/632; 318/560
[58] Field of Search ................ 318/652, 632, 560, 628

[56] References Cited

U.S. PATENT DOCUMENTS

| | | | |
|---|---|---|---|
| 4,052,642 | 10/1977 | Speth et al. | 318/632 |
| 4,460,968 | 7/1984 | Cavill et al. | 318/632 |
| 4,549,125 | 10/1985 | Sonobe | 318/632 |
| 4,855,655 | 8/1989 | Shimizu | 318/628 |

*Primary Examiner*—William M. Shoop, Jr.
*Assistant Examiner*—Karen Masih
*Attorney, Agent, or Firm*—Davis, Bujold & Streck

[57] ABSTRACT

This is a method and associated apparatus for employing a non-regulated voltage input to a DC driver normally outputting a voltage having a curve with a dead band and a variable slope which is a function of the non-regulated voltage input to produce an output to a DC precision positioner from the DC driver which has a constant slope and no deadband. It is particularly useful in pen plotters. The method comprises the steps of, sensing the position of the DC precision positioner and outputting a digital signal indicating the position; calculating the slope of the voltage output from the DC driver; obtaining a pre-established voltage compensation value on a compensation voltage curve which will force the voltage output from the DC driver to attain a value on a voltage curve having a constant slope and no deadband; and, inputting the pre-established voltage compensation value to the DC driver in combination with the non-regulated voltage input whereby the voltage output from the DC driver driving the DC precision positioner attains the value on the voltage curve having a constant slope and no deadband.

16 Claims, 2 Drawing Sheets

METHOD AND APPARATUS FOR EMPLOYING AN UNREGULATED POWER SUPPLY TO POWER PRECISION MOTORS IN A PEN PLOTTER

BACKGROUND OF THE INVENTION

This invention relates to power supplies for powering DC positioning motors and, more particularly, in a pen plotter having a DC precision positioner driven by a DC driver normally outputting a voltage having a curve with a dead band and a variable slope which is a function of the voltage input thereto, to the improvement for allowing a non-regulated voltage supply to be used as an input to the DC driver comprising, voltage curve determination means for periodically sensing and determining a present voltage curve for the voltage output from the DC driver; and, compensation voltage application means for inputting a compensation voltage to the DC driver in combination with voltage from the non-regulated voltage supply which will force the voltage output from the DC driver to attain a value on a voltage curve having a constant slope and no deadband.

FIG. 1 preferred circuit 10. The input to the circuit 10 is a non-regulated voltage VNR of 24–36 volts (i.e. 30 volts plus or minus 6 volts) which is transmitted on line 12 via a power MOSFET transistor (power driver) 14 and a power inductor 16 through line 18 to drive the fan motor 20.

The non-regulated voltage VNR is also transmitted via the line 22 and an analog-to-digital (A/D) converter 24 to the digital controller 26 which is provided with look-up tables 28 defining pulse width modulated outputs. Depending on the digitized magnitude of the non-regulated voltage VNR received from the A/D converter 24, the logic contained in the firmware 30 of the controller 26 uses that value as an index to read out a compensation value from the associated entry in the look-up tables 52 and transmits a corresponding pulse width modulated (PWM) output on line 32 to the base of the transistor 34 which, in turn, controls the power MOSFET transistor (power driver) 14. As depicted in FIG. 4, the PWM output on line 32 determines the time T1 out of the total duty cycle, T, that transistors 34 and 14 are on.

When the transistors 34 and 14 are conducting or "on", the current IL flowing through the power inductor 16 charges the capacitor 36. When the transistors 34 and 14 are on for only a part of the duty cycle T, the capacitor 36 discharges. Ideally, the voltage level on line 18 is maintained at 24 volts. When the non-regulated voltage VNR on line 12 is 24 volts, the PWM output from the controller 26 is such that the transistors 34 and 14 are on all of the time. When the non-regulated voltage VNR on line 12 is greater than 24 volts, the PWM output from the controller 26 is such that the transistors 34 and 14 are on for a portion of the duty cycle T as a function of the magnitude of the voltage. In tested embodiments, it was found that by pre-computing the values for the look-up tables 52 and then adjusting them for actual conditions as part of a calibration process, the voltage on line 18 into the fan motor 30 could be maintained effectively at 24 volts within the desired tolerances. The use of look-up tables and the calculations for determining the values of the PWM outputs for particular applications are procedures well known and understood by those skilled in the art which can be accomplished without undue experimentation and, therefore, in the interest of simplicity and the avoidance of redundancy, the details thereof have not been described herein on in that co-pending application.

There are other "motors" within a pen plotter which, if powerable from a non-regulated voltage, could also provide a lower cost-to-build benefit to the manufacturer of the pen plotter. In particular, these include a drum drive motor providing x-axis movement, a carriage drive motor providing y-axis movement, and a pen height motor for lifting, lowering, and positioning a plotting pen in the z-axis. While the above-referenced co-pending application was directed to providing a constant voltage level through the use of firmware control of a non-regulated power source, these other motors are of the DC type wherein the torque of the motor is dependent on the voltage input thereto, wherefore a constant gain or slope of the voltage curve must be maintained in order to perform precision positioning with the motor.

Wherefore, it is the object of this invention to provide an alternate approach to the subject matter of the above-referenced co-pending application which will allow firmware control of a non-regulated power source to provide a voltage output having a constant gain or slope to the voltage curve.

SUMMARY

The foregoing object has been attained by the apparatus of the present invention for employing a non-regulated voltage input to a DC driver normally outputting a voltage having a curve with a dead band and a variable slope which is a function of the non-regulated voltage input to produce an output to a DC precision positioner from the DC driver which has a constant slope and no deadband comprising, sensing means for periodically sensing the position of the DC precision positioner and for outputting a digital signal indicating the position; slope calculation means for using the digital signal to calculate the slope of the voltage output from the DC driver; lookup table means for storing a plurality of voltage compensation values on a compensation voltage curve which will force the voltage output from the DC driver to attain a value on a voltage curve having a constant slope and no deadband; compensation logic means for using the slope of the voltage output from the DC driver to obtain a pre-established voltage compensation value from the lookup table means which will force the voltage output from the DC driver to attain a value on the voltage curve having a constant slope and no deadband; and, compensation application means for inputting the pre-established voltage compensation value to the DC driver in combination with the non-regulated voltage input whereby the voltage output from the DC driver driving the DC precision positioner attains the value on the voltage curve having a constant slope and no deadband.

The preferred embodiment also includes means for compensating the slope of the voltage output from the DC driver for frictional effects in the DC precision positioner, means for digitally filtering the value of the slope of the voltage output from the DC driver, and buffer means for receiving and holding the digital signal indicating the position from the sensing means.

DESCRIPTION OF THE PREFERRED EMBODIMENT

Figure 1:
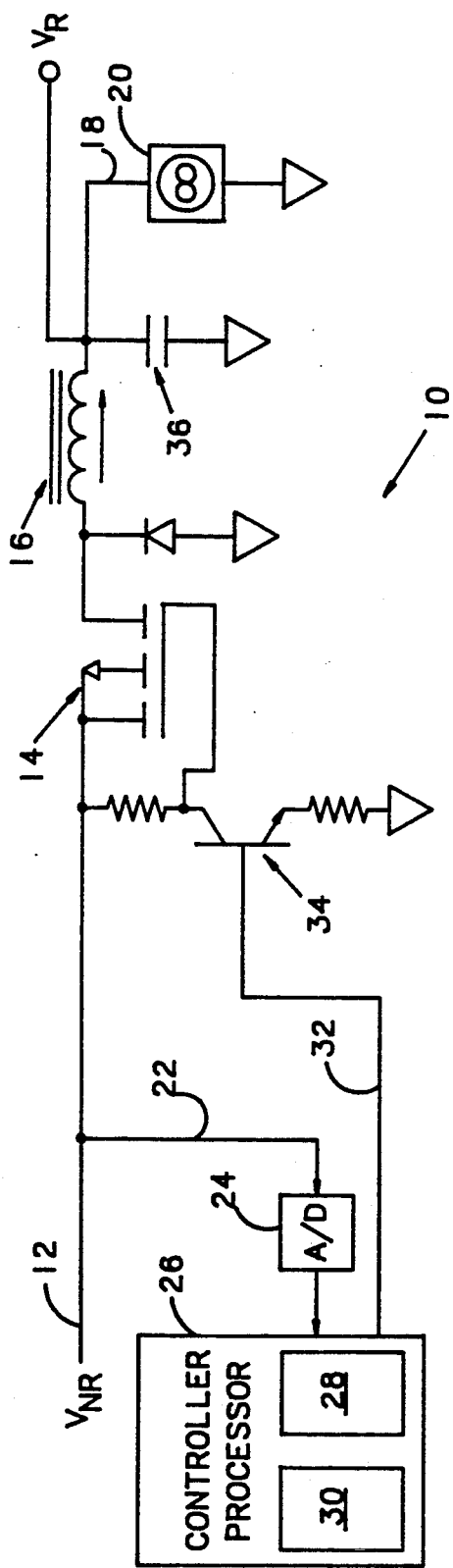
FIG. 1 is a drawing of a circuit employing compensation technology related to the present invention.
Figure 2:
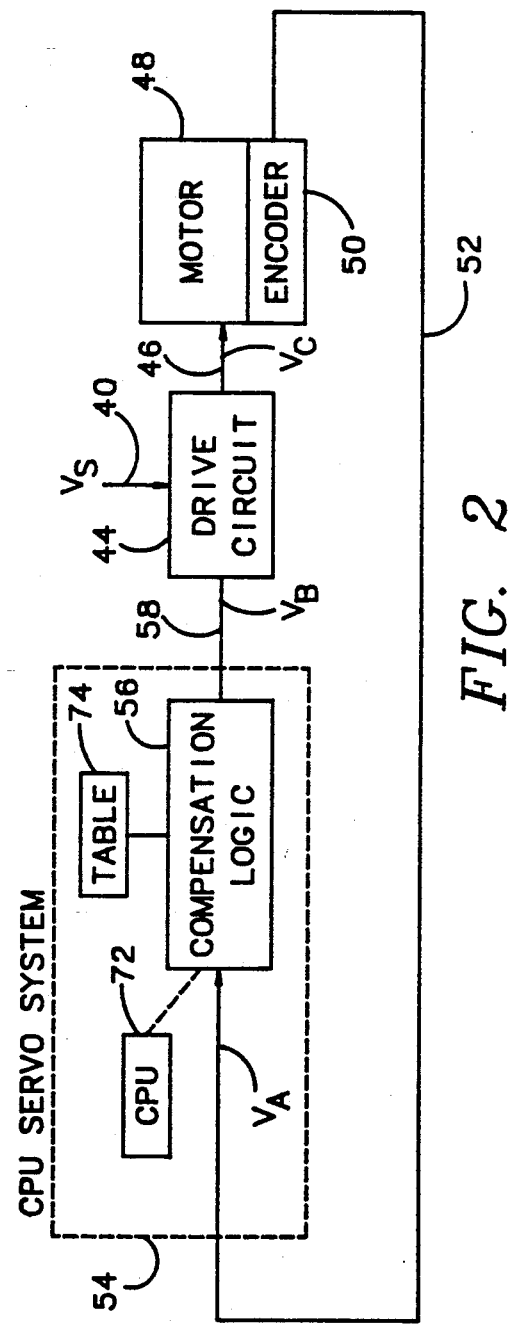
FIG. 2 is a functional block diagram of the control circuit employed to power a motor according to the present invention.

An approach for employing a non-regulated voltage in regulated voltage applications for driving a DC motor or the like by means of a software or firmware compensation approach according to the present invention is shown in FIG. 2. As depicted therein, the output of a non-regulated power supply (typically 30 V plus or minus 6 V) is input on line 40 to a drive circuit 44, the output $V_C$ of which is transmitted via line 46 to drive the motor 48. The motor 48 has a position encoder 50 connected thereto of a standard type well known in the art providing a digital output signal; and, the output of the motor position encoder 50 is transmitted via line 52 to the CPU servo system 54. As will be seen, the output voltage $V_C$ from the drive circuit 44 is a function of both the power supply voltage $V_S$ at 40 and an adjustment voltage $V_B$ transmitted via line 58 from a compensation circuit 56 in the CPU servo system 54 to the drive circuit 44. The major point of novelty of this invention resides in compensating for the unregulated supply voltage $V_S$ by means of logic implemented in firmware contained within the CPU servo system 54.

Figure 3:
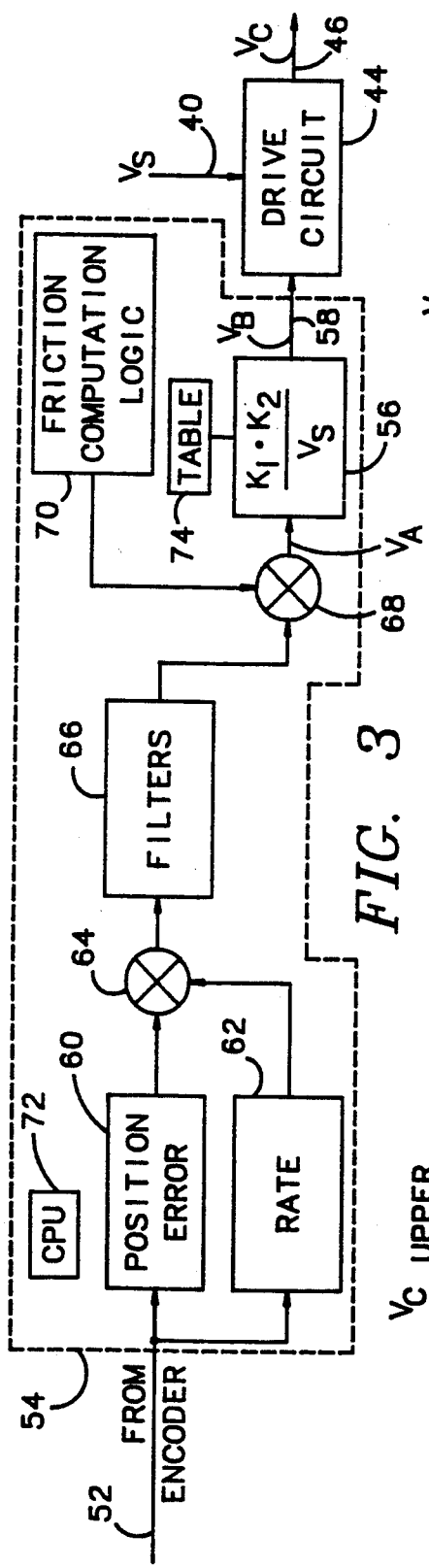
FIG. 3 is a functional block diagram in greater detail of the circuit of FIG. 2.

As depicted in FIG. 3, the output from the motor position encoder 50 is transmitted to a position error buffer 60 and a rate buffer 62, also contained within the CPU servo system 54. In the preferred implementation as shown, the outputs of the position error buffer 60 and rate buffer 62 are summed at 64 and transmitted to appropriate filter logic 66 (which may include high-pass, low-pass, or notch filters) whose output is summed at 68 with the output of friction compensation logic 70 (comprising calculated values from known data) and transmitted via the compensation logic 56 to the drive circuit 44 for the motor 48. In the preferred implementation as shown and described herein, the filter logic 66, the summing functions at 64 and 68, the friction compensation logic 70, and the compensation logic 56 are all implemented in firmware executed by the CPU 72 contained within (or accessing and implementing) the CPU servo system 54. In this regard, most pen plotters have a CPU performing many functions therein. In such a case, the CPU 72 may, in fact, comprise the main CPU of the pen plotter. The filter logic 66 and the friction compensation logic 70 are according to techniques well apparent to those skilled in the art and individually and per se do not form a point of novelty of the present invention. In the interest of simplicity and the avoidance of redundancy, therefore, they will not be addressed in any detail herein.

Figure 4:
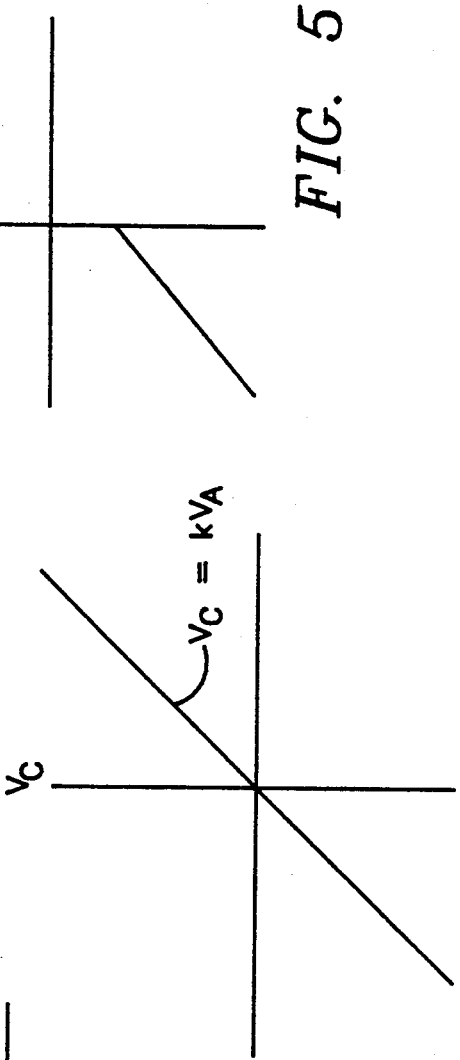
FIG. 4 is a graph related to the present invention.
Figure 5:
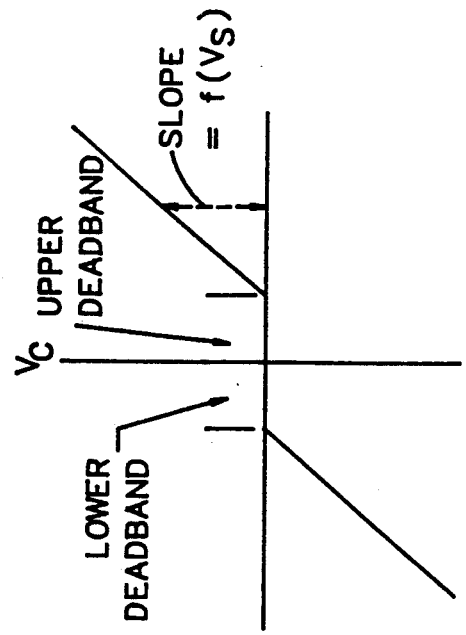
FIG. 5 is a graph related to the present invention.
Figure 6:
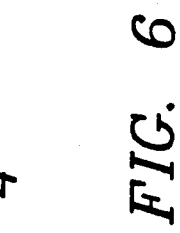
FIG. 6 is a graph related to the present invention.

Referring back to FIG. 2, the input to the firmware defining the compensation logic 56 is $V_A$, the output is $V_B$, and the output of the drive circuit 44 is $V_C$. As depicted in FIG. 4, the normal uncompensated output $V_C$ of the drive circuit 44 is a non-linear function of both the supply voltage $V_S$ and $V_B$. In addition, the output of the drive circuit 44 has a dead band as shown. The slope of the curve is a function of the supply voltage $V_S$. The compensation logic 56 preferably employs one or more lookup tables 74 containing input and output values defining a response curve as depicted in FIG. 5 which will compensate for both the dead band and to changes in the slope of the output curve $V_C$ for the drive circuit 44 to compensate for changes in $V_S$. The resultant preferred compensated output $V_C$ for the drive circuit 44 is shown in FIG. 6. Note that by applying the compensation of the curve of FIG. 5 as obtained from the lookup table 74 to the normal uncompensated output of the drive circuit 44, the resultant output $V_C$ has a constant slope (i.e. independent of any fluctuations in $V_S$) and no dead band, as required for the application.

Wherefore, having thus described the present invention, what is claimed is:

1. A method of employing a non-regulated voltage input to a DC driver normally outputting a voltage having a curve with a dead band and a variable slope which is a function of the non-regulated voltage input to produce an output to a DC precision positioner from the DC driver which has a constant slope and no deadband comprising the steps of:
   a) sensing the position of the DC precision positioner and outputting a digital signal indicating the position;
   b) calculating the slope of the voltage output from the DC driver;
   c) obtaining a pre-established voltage compensation value on a compensation voltage curve which will force the voltage output from the DC driver to attain a value on a voltage curve having a constant slope and no deadband; and,
   d) inputting the pre-established voltage compensation value to the DC driver in combination with the non-regulated voltage input whereby the voltage output from the DC driver driving the DC precision positioner attains the value on the voltage curve having a constant slope and no deadband.

2. The method of claim 1 and before said step of obtaining a pre-established voltage compensation value additionally comprising the step of:
   compensating the slope of the voltage output from the DC driver for frictional effects in the DC precision positioner.

3. The method of claim 1 and before said step of obtaining a pre-established voltage compensation value additionally comprising the step of:
   digitally filtering the value of the slope of the voltage output from the DC driver.

4. Apparatus for employing a non-regulated voltage input to a DC driver normally outputting a voltage having a curve with a dead band and a variable slope which is a function of the non-regulated voltage input to produce an output to a DC precision positioner from the DC driver which has a constant slope and no deadband comprising:
   a) sensing means for periodically sensing the position of the DC precision positioner and for outputting a digital signal indicating said position;
   b) slope calculation means for using said digital signal to calculate the slope of the voltage output from the DC driver;
   c) lookup table means for storing a plurality of voltage compensation values on a compensation voltage curve which will force the voltage output from the DC driver to attain a value on a voltage curve having a constant slope and no deadband;
   d) compensation logic means for using said slope of the voltage output from the DC driver to obtain a pre-established voltage compensation value from said lookup table means which will force the voltage output from the DC driver to attain a value on said voltage curve having a constant slope and no deadband; and, e) compensation application means for inputting said pre-established voltage compensation value to the DC driver in combination with the non-regulated voltage input whereby the voltage output from the DC driver driving the DC precision positioner attains said value on said voltage curve having a constant slope and no deadband.

5. The apparatus of claim 4 and additionally comprising:

means for compensating said slope of the voltage output from the DC driver for frictional effects in the DC precision positioner.

6. The apparatus of claim 4 and additionally comprising:

means for digitally filtering said value of said slope of the voltage output from the DC driver.

7. The apparatus of claim 4 and additionally comprising:

buffer means for receiving and holding said digital signal indicating said position from said sensing means.

8. In a pen plotter having a DC precision positioner driven by a DC driver normally outputting a voltage having a curve with a dead band and a variable slope which is a function of the voltage input thereto, the improvement for allowing a non-regulated voltage supply to be used as an input to the DC driver comprising:

a) sensing means for periodically sensing the position of the DC precision positioner and for outputting a digital signal indicating said position;

b) slope calculation means for using said digital signal to calculate the slope of the voltage output from the DC driver;

c) lookup table means for storing a plurality of voltage compensation values on a compensation voltage curve which will force the voltage output from the DC driver to attain a value on a voltage curve having a constant slope and no deadband;

d) compensation logic means for using said slope of the voltage output from the DC driver to obtain a pre-established voltage compensation value from said lookup table means which will force the voltage output from the DC driver to attain a value on said voltage curve having a constant slope and no deadband; and, e) compensation application means for inputting said pre-established voltage compensation value to the DC driver in combination with the non-regulated voltage input whereby the voltage output from the DC driver driving the DC precision positioner attains said value on said voltage curve having a constant slope and no deadband.

9. The improvement to a pen plotter of claim 8 and additionally comprising:

means for compensating said slope of the voltage output from the DC driver for frictional effects in the DC precision positioner.

10. The improvement to a pen plotter of claim 8 and additionally comprising:

means for digitally filtering said value of said slope of the voltage output from the DC driver.

11. The improvement to a pen plotter of claim 8 and additionally comprising:

buffer means for receiving and holding said digital signal indicating said position from said sensing means.

12. In a pen plotter having a DC precision positioner driven by a DC driver normally outputting a voltage having a curve with a dead band and a variable slope which is a function of the voltage input thereto, the improvement for allowing a non-regulated voltage supply to be used as an input to the DC driver comprising:

a) voltage curve determination means for periodically sensing and determining a present voltage curve for the voltage output from the DC driver; and, b) compensation voltage application means for inputting a compensation voltage to the DC driver in combination with voltage from the non-regulated voltage supply which will force the voltage output from the DC driver to attain a value on a voltage curve having a constant slope and no deadband.

13. The improvement to a pen plotter of claim 12 wherein said voltage curve determination means and said compensation voltage application means comprise:

a) sensing means for periodically sensing the position of the DC precision positioner and for outputting a digital signal indicating said position;

b) slope calculation means for using said digital signal to calculate the slope of the voltage output from the DC driver;

c) lookup table means for storing a plurality of voltage compensation values on a compensation voltage curve which will force the voltage output from the DC driver to attain a value on a voltage curve having a constant slope and no deadband;

d) compensation logic means for using said slope of the voltage output from the DC driver to obtain a pre-established voltage compensation value from said lookup table means which will force the voltage output from the DC driver to attain a value on said voltage curve having a constant slope and no deadband; and, e) compensation application means for inputting said pre-established voltage compensation value to the DC driver in combination with the non-regulated voltage input whereby the voltage output from the DC driver driving the DC precision positioner attains said value on said voltage curve having a constant slope and no deadband.

14. The improvement to a pen plotter of claim 13 and additionally comprising:

means for compensating said slope of the voltage output from the DC driver for frictional effects in the DC precision positioner.

15. The improvement to a pen plotter of claim 13 and additionally comprising:

means for digitally filtering said value of said slope of the voltage output from the DC driver.

16. The improvement to a pen plotter of claim 13 and additionally comprising:

buffer means for receiving and holding said digital signal indicating said position from said sensing means.

* * * * *